July 29, 1969  B. F. BARKLEY ET AL  3,458,152
CABLE-DISPENSING SUPPORT FOR CONDUCTOR-CABLE REELS
Filed Dec. 23, 1966  5 Sheets-Sheet 1

INVENTORS:
BYRON F. BARKLEY
WILLIAM H. KIBBIE.
BY:
MALLINCKRODT & MALLINCKRODT
ATTORNEYS.

July 29, 1969  B. F. BARKLEY ET AL  3,458,152

CABLE-DISPENSING SUPPORT FOR CONDUCTOR-CABLE REELS

Filed Dec. 23, 1966  5 Sheets-Sheet 2

INVENTORS:
BYRON F. BARKLEY
WILLIAM H. KIBBIE.
BY:
MALLINCKRODT & MALLINCKRODT

ATTORNEYS.

July 29, 1969  B. F. BARKLEY ET AL  3,458,152
CABLE-DISPENSING SUPPORT FOR CONDUCTOR-CABLE REELS
Filed Dec. 23, 1966  5 Sheets-Sheet 4

INVENTORS:
BYRON F. BARKLEY
WILLIAM H. KIBBIE,
BY:
MALLINCKRODT & MALLINCKRODT

ATTORNEYS.

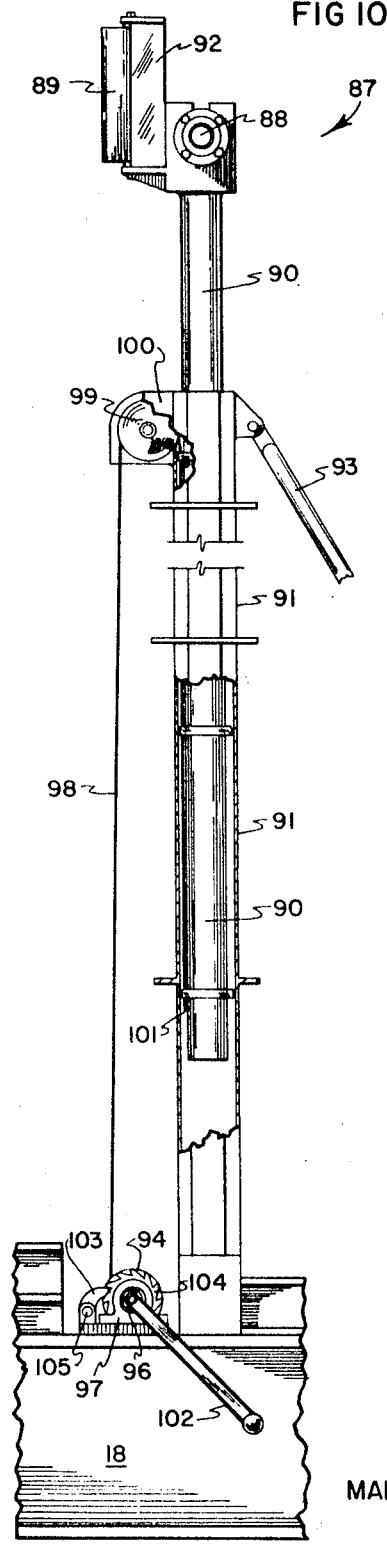

United States Patent Office 3,458,152
Patented July 29, 1969

3,458,152
CABLE-DISPENSING SUPPORT FOR CONDUCTOR-CABLE REELS
Byron F. Barkley and William H. Kibbie, both of 717 South 4th West St., Salt Lake City, Utah 84116
Filed Dec. 23, 1966, Ser. No. 604,460
Int. Cl. B65h 75/40
U.S. Cl. 242—86.7
8 Claims

ABSTRACT OF THE DISCLOSURE

A support for carrying conductor-cable reels and dispensing cable therefrom. Pneumatically tired wheels are employed to directly receive and support the rims of one or more shaft-mounted cable reels, and means are provided for releasing split bearings journaling such shaft when lightening of the load by the dispensing of cable places excessive pressure on the upper halves of the split bearings.

---

Figure 1:
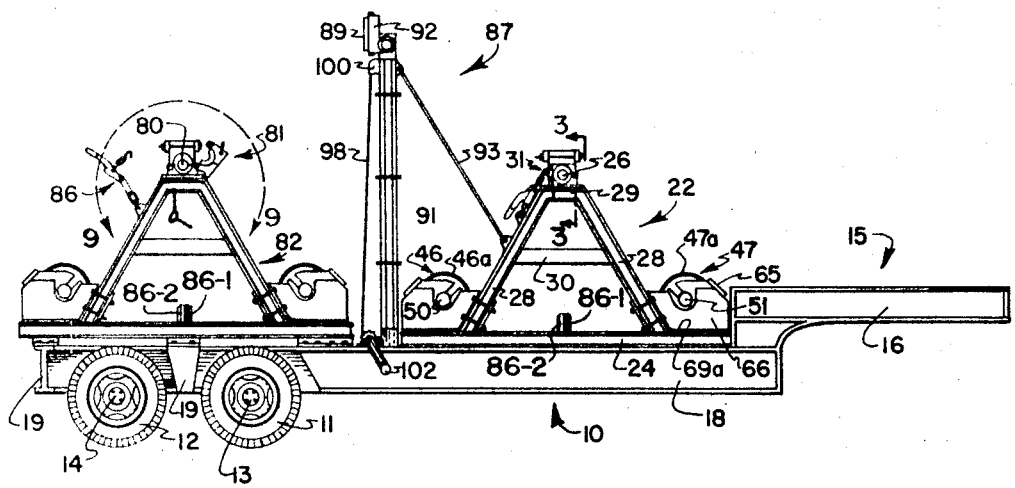

This invention relates to supports for large diameter reels of conductor cable of the kind commonly used for high voltage power transmission lines, which supports are usually mobile.

The reels around which large diameter conductor cable is wrapped are very large, the side flanges of some currently used being as much as 108 inches in diameter. When empty, these reels weight about 1,930 pounds; fully loaded they may weight 23,000 pounds, or more.

In the past, trucks and trailers have been equipped to become mobile supports for reels loaded with conductor cable, but these have proved unsuitable for the larger and more heavily loaded reels now frequently used. When attempts have been made to carry these larger reels on such previously known mobile supports the existing bearing arrangements for the reel support shafts have proven unworkable and the so-loaded transports could not be moved over many highways, either because the overall width was too great or because the overall height was not within the limits allowed for such road travel.

Overheating and failure of brakes used on reel shafts to maintain cable tension as it is strung is not uncommon and in those instances where brake bands have been employed around the peripheries of the side flnages of the reels, it has been found that the rough and uneven edges of the flanges rapidly destroy the bands and make such systems unsatisfactory.

Principal objects of the present invention are to provide a mobile support capable of carrying at least two large size reels along highways in complete compliance with State and Federal highway height and width loading requirements, without excessive wear on shaft bearings of the reel support and so that the reel brakes not only have long life but include wheel components which assist the bearings in supporting the weight of the reels.

Outstanding features of the invention, in the accomplishment of these objects, are a special arrangement of the reel support shafts, a split bearing construction in which one-half of a bearing is fixed to receive each end of a reel support shaft and the other half of the bearing is clamped thereover, thus making it a fairly simple project to load reels; special brake means for the reels that include wheels to engage and partially support the peripheries of the side flanges of the reels; and special force applicators for use in releasing the reel support shafts from their split bearings so that it is relatively easy to unload empty or partially loaded reels. Another feature is the provision of a vertically adjustable, elevated, guide roller to maintain the conductors from the two respective reels separate and apart from each other.

There is shown in the accompanying drawings a specific embodiment of the invention representing what is presently regarded as the best mode of carrying out the generic concepts in actual practice. From the detailed description of this presently preferred form of the invention, other more specific objects and features will become apparent.

Figure 2:
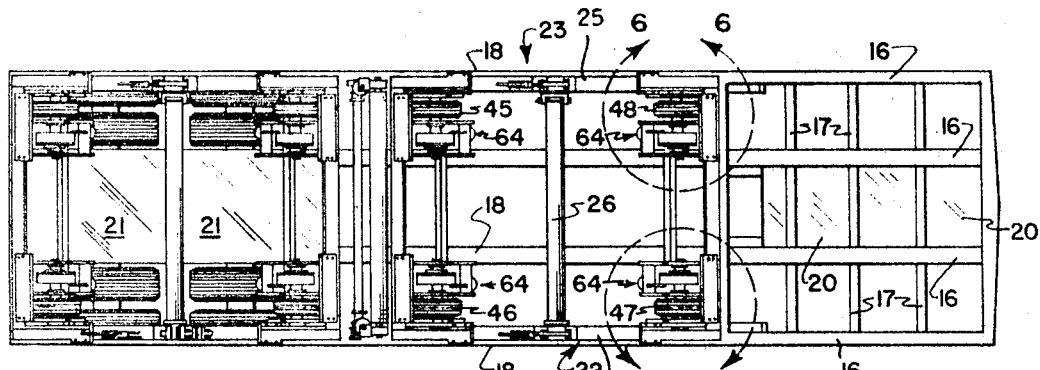
Figure 3:
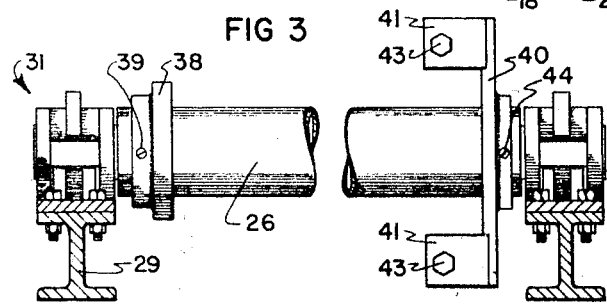
Figure 4:
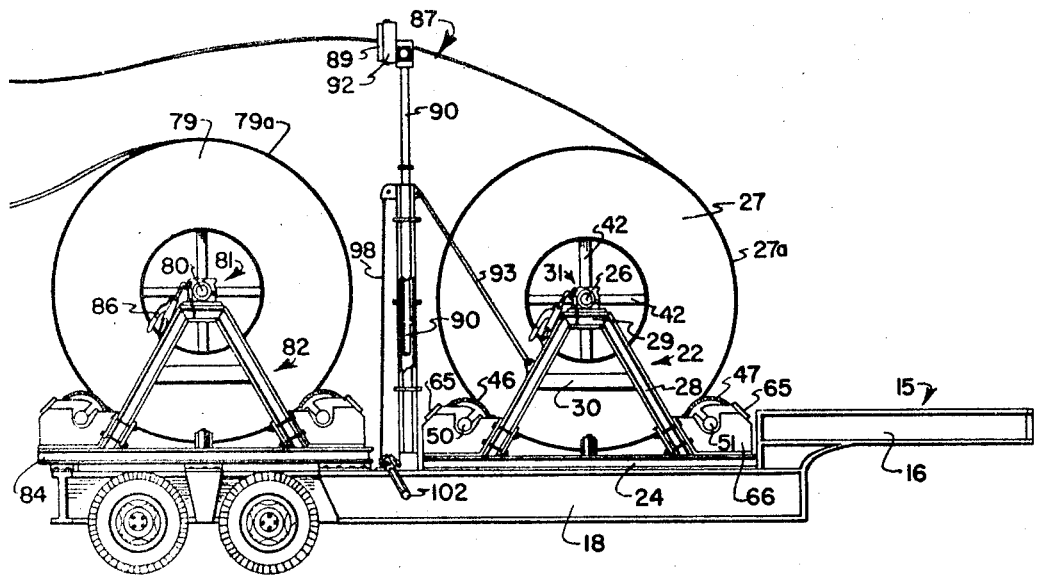
Figure 5:
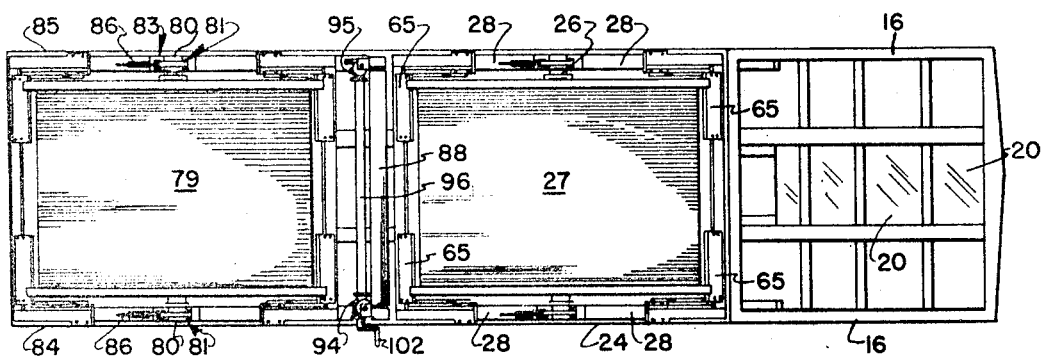
Figure 6:
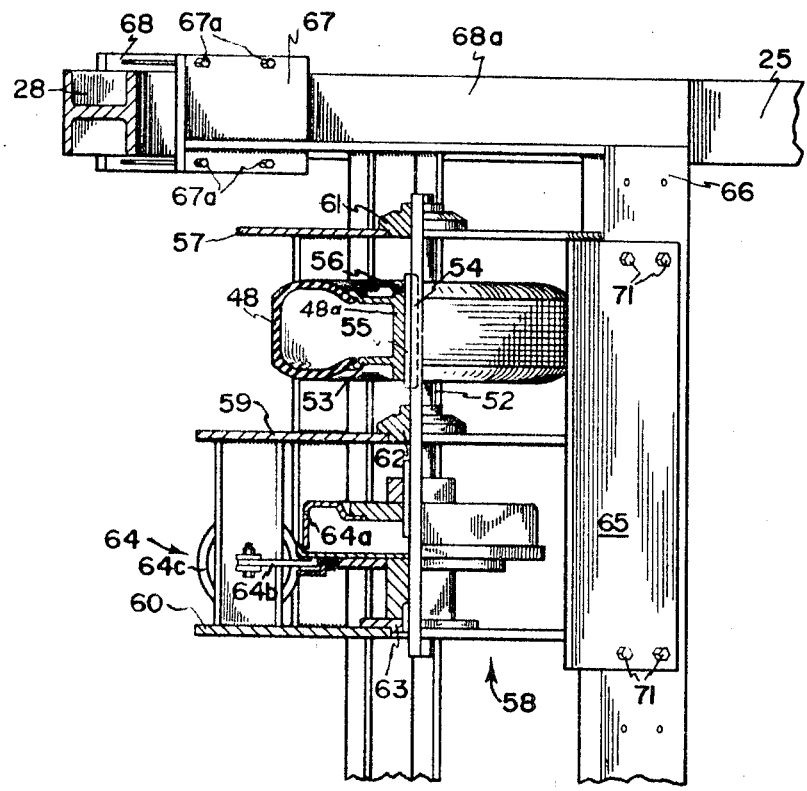
Figure 9:
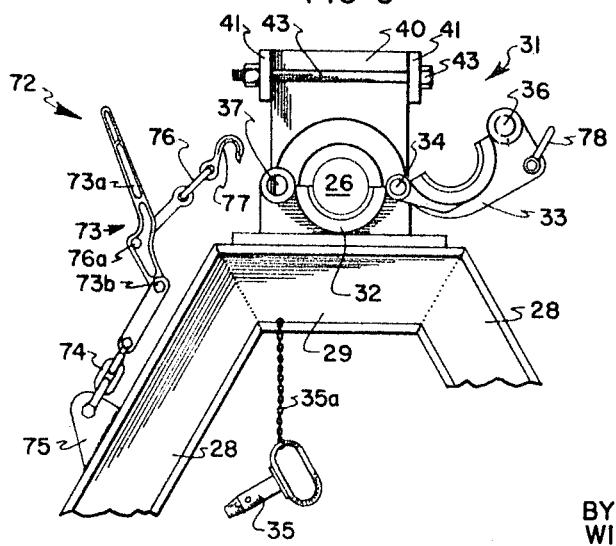
Figure 7:
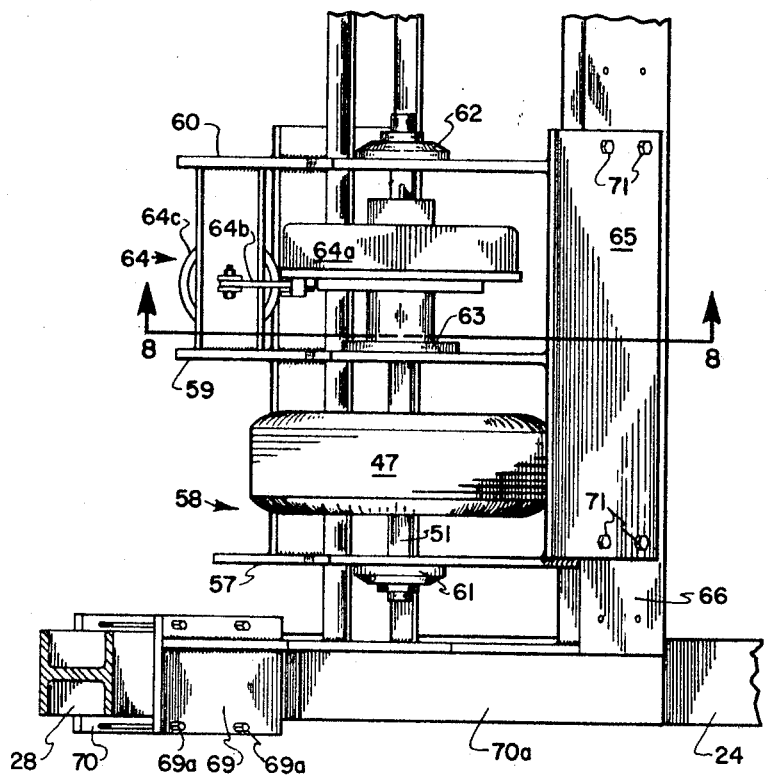
Figure 8:
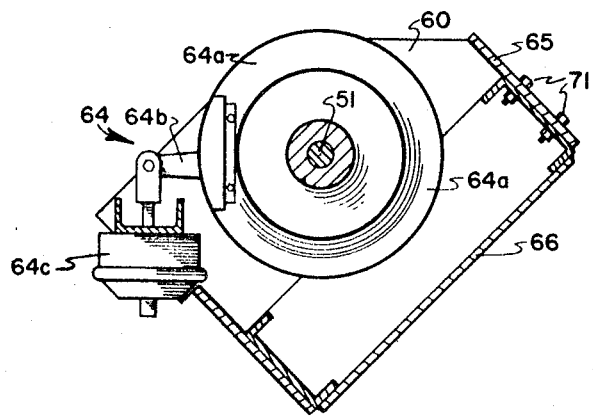

In the drawings:

FIG. 1 is a view in side elevation of a trailer constructed in accordance with the invention and shown without reels;

FIG. 2, a top plan view;

FIG. 3, a fragmentary vertical section taken on the line 3—3 of FIG. 1;

FIG. 4, a view corresponding to FIG. 1, but showing reels in place, with the lever devices engaged, the elevated guide roller raised above its retracted position, and the housing of one of the guide roller supports partially broken away to reveal the hoisting mechanism;

FIG. 5, a view corresponding to that of FIG. 2, but taken with respect to FIG. 4;

FIG. 6, a partially cut-away enlargement of that portion of FIG. 2 enclosed within the line 6—6, showing the braking structure on one side of the trailer in detail;

FIG. 7, an enlargement of that portion of FIG. 2 enclosed within the line 7—7, showing the braking structure mounted on the other side of the trailer;

FIG. 8, a longitudinal vertical section taken on the line 8—8 of FIG. 7, showing the mounting of the brake wheels;

FIG. 9, an enlargement of that portion of FIG. 1 enclosed within the line 9—9; and FIG. 10, an enlargement of that part of FIG. 1 showing the elevated guide roller, with a portion of one guide roller support housing broken away to show interior details.

Referring now to the drawings:

In the illustrated preferred embodiment, the mobile support is in the form of a trailer adapted to be towed by a truck or other available prime mover, not shown, but as will be obvious, it could as well be a truck bed.

As shown, the trailer includes a frame 10, carried in conventional fashion by sets of road wheels 11 and 12 mounted on dual axles 13 and 14 disposed rearwardly of the frame. A raised extension 15 is mounted on the frame 10 and extends forwardly thereof as a tongue for coupling the trailer to a truck, tractor, or similar prime mover, not shown.

For rigidity and strength, extension 15 is preferably made in grid formation from a number of structural steel longitudinal stringers 16 and cross members 17. It is cantilevered forwardly from a main frame 10 that is made up of a number of longitudinally extending main stringers 18, interconnected at spaced intervals along their lengths by cross-members 19, two of which are shown in FIGS. 1 and 4.

Reinforcement plates 20 may be used to interconnect the stringers 16 and cross members 17 and similar plates 21 may be used to interconnect the main stringers 18 and cross members 19.

As illustrated, the axles 13 and 14 are mounted beneath the rear portion of main frame 10 and the outermost main stringers 18 are cut away to allow clearance for wheels 11 and 12.

A pair of A-frame support standards 22 and 23 stand on beams 24 and 25, respectively, at opposite sides of the forward ends of the main platform adjacent to the extension 15, and are adapted to support the ends of a shaft 26, FIGS. 1–3, that serves as an axle for a reel 27, FIGS. 4 and 5, of conductor cable. Each A-frame has legs 28 that are interconnected at their upper ends by a member 29 and by a brace 30 that is fastened to the legs intermediate their lengths.

A bearing structure, shown generally at 31, is supported on top of each leg to provide bearings for the shaft 26. The bearing structures are of split casing type and each includes a lower half 32, FIG. 9, fixed on top of a member 29 of an A-frame and an upper half 33 that is pivoted at 34 to the lower half and that is secured in position over the top of shaft 26 by a pin 35 passed through holes in ears 36 and 37, respectively, of the upper and lower halves.

In the installation or removal of a reel 28, the pins 35 are removed and suspended from respective chains 35a fixed to the respective members 29, the upper halves 33 are pivoted off the shaft 26, and the shaft is removed using a crane or other lifting device. In installing the shaft in a reel, such shaft is inserted through the hole at the center of reel until collar 38, FIG. 3, which is positioned on shaft 26 by set screws 39, is tight against the reel. Bracket 40 is then slid onto the end of such shaft 26 opposite collar 38 until the arms 41 and 41a of the bracket extend into the reel on opposite sides of a spoke 42, FIG. 4, of the reel, and a bolt 43 is then passed through holes in the arms to secure the bracket to the reel. Set screws 44 secure the bracket to the shaft. With the bracket thus positioned, the reel 27 and shaft 26 will at all times turn together.

The crane or other lifting device is used to raise the shaft 26 after insertion in a loaded reel 27 and to again position the ends of the shaft on the lower halves 32 of the bearing structures. The upper halves 33 are then pivoted over the shaft 26 and pins 35 are inserted to secure the halves together in surrounding relationship to the ends of the shaft.

When the shaft 26 is set in the lower halves 32 of the bearing structures, the rims 27a of the reel also are rested on the pneumatic tires 45, 46, 47, and 48, that are respectively mounted on wheels 45a, 46a, 47a, and 48a. The wheels 45a–48a are respectively carried by axles 49, 50, 51, and 52. Each wheel includes a hub 53, FIG. 6, that is held for rotation with the associated axle by means of a keyway 54 that mates with a key 55 on the axle. Set screws 56 extend through a flanfie of the hub and engage with the axle to prevent undesired sliding movement of the wheel therealong.

Each of the axles has one of its ends journaled in a side plate 57 of a support 58, is journaled through a intermediate plate 59, and has its other end journaled in another side plate 60 of the support. The bearings 61, 62, and 63 through which the axles are passed are removably connected to the plates 57, 58, and 60 respectively, and, when they are released from the plates, the axles can be lifted from the support 58, and the wheels can be removed by releasing the set screws 56 and sliding the wheels from the axle. Plates 57, 59 and 60 are interconnected by an additional plate 65. During use, the wheels are positioned on the axles between plates 57 and 59 and a brake unit 64 is positioned between plates 59 and 60.

The brake units can be of any suitable type, as for example a model DLM or a model DCM manufactured by the Rockwell-Standard Corporation. As illustrated, the brake drums 64a are fixed to and rotate with their associated axles and actuation of the brake shoes, through a conventional pneumatic system and linkage arm 64b, moves the brake shoes to apply a braking force to the drums and, as a result thereof, to the axles and the wheels connected thereto.

The brakes to all wheels are applied simultaneously and can be controlled from the prime mover or other desired remote location. The usual brake hoses (not shown) extend from the individual brake cylinders 64c to a control valve (not shown) at the point of application.

To insure proper positioning of the wheels so that they will engage the reel rims to partially support the reel, regardless of the size of the reel being used, supports 58 are each mounted on a base 66 that extends between opposite legs 28 of the A-frames 22 and 23 and that has opposite end supports 68 and 70.

A plate 67, fastened with bolts 67a to the end support 68, has an A-frame leg 28 therebetween. A plate 69 is similarly fastened to the end support 70 with a corresponding leg of the other A-frame therebetween. By releasing the bolts 67a and sliding the bases up or down the A-frame legs, the wheels can be moved to provide the desired contact with the reel rims. Also, since the supports 58 are fastened to the bases 66 by bolts 71 which are passed through plate 65 and can be removed, the supports 58 can be moved laterally along the bases to align the wheels with the reel rims before the bolts are reinserted through selected holes in the bases 66 and tightened to hold the supports in their set position. In the lowermost position of the bases, flanges 68a and 70a of the end supports 68 and 70 rest on beams 25 and 24 respectively. If desired, spacer members (not shown) can be positioned between the beams and the end supports as the standards are raised on the legs 28 to provide additional support for the bases.

Conductor is paid out from the top of the reel toward the rear of the trailer. As the conductor is removed and the weight of the reel decreases, the resilient pneumatic tires 45–48 push the reel 27 and shaft 26 upward. This upward thrust is transmitted to the upper halves 33 of the bearings 31, tending to raise them and cause a binding on pins 35 that makes them extremely difficult to remove. As an aid in overcoming this binding, a force applicator 72 is provided for each bearing 31.

The force applicators each include a lever 73 that has a handle 73a at one end and its other end 73b pivotally connected to one end of a chain 74 that has its other end pivotally connected to a bracket 75 on one leg 28 of the A-frame on which the bearing to be released is mounted. A link 76 has one of its ends pivotally connected to lever 73 at 76a, intermediate the length of the lever but near the pivot connection with chain 74. The other end of link 76 carries a hook 77 that is adapted to be connected to a ring 78 mounted on top of associated upper half 33 of the bearing assembly.

When hook 77 is connected to ring 78 and handle 73a is pulled down, the other end of the lever is pushed up and is held by chain 74, the connection between lever 73 and chain 74 thus serving as a fulcrum. A force applied through the lever easily pulls the upper half 33 of the bearing assembly down until pin 35 can be readily removed. Once the pin is removed it is a simple matter to lift the shaft and empty reel from the lower portions of the bearings.

As is best seen in FIGS. 4 and 5, another conductor reel 79 is mounted on a shaft 80 in the same manner that reel 27 is mounted on shaft 26. Shaft 80 is then supported in split bearing assemblies 81, similar in construction to the split bearing assemblies 31. Split bearing assemblies 81 are mounted at the top of A-frames 82 and 83 that stand on beams 84 and 85 that overlie the outside main stringers 18 at the rear of the main frame 10. Pneumatic tires, wheels and brake units like those heretofore described, are also used to engage the steel rims 79a and to support the reel 79. Because the construction, mounting, and operation of these units are the same as for those described in connection with reel 27 further description is not believed necessary. Similarly, the construction, mounting, and operation of the lever-type, force applicators 86 used to release pins of the split-type bearing assemblies 81 after the reel has been unloaded are the same as for the lever-type, force applicators previously disclosed and will not be further described.

As the reels turn, when the cable is pulled from them, they tend to develop a lateral movement and if allowed to contact the A-frame could cause serious damage. To prevent such damage rollers 86-1 mounted vertically on a bracket 86-2, that are carried by the main frame are positioned to be contacted by the reels should such lateral movement occur.

Conductor wire is paid out from the top of reel 27 and passes over an elevated, guide roller assembly 87 FIG. 4, toward the rear of the trailer. With this arrangement, cable can be paid out from both reels 27 and 76 simultaneously, and cable being discharged from the front reel 27 does not sag into contact with that being discharged from reel 79. Should the cables come into contact with one another or with other objects, the aluminum covering most frequently used for such cables can be easily damaged, with a resultant loss of power transmission through the line after it has been installed.

The elevated roller assembly includes a horizontal roller 88 FIG. 10, over which the cable is passed. Vertical rollers 89 are provided, one at each side of roller 88, and extend upwardly therefrom so that the cable cannot slide off the ends of the horizontal roller.

Roller 88 has its ends journaled for rotation in posts 90 that telescope inside upright hollow posts 91 carried by the outside stringers 18 of the main frame 10. The roller is then positioned intermediate the A-frames supporting reel 27 and those supporting reel 79.

Brackets 92, fixed to the tops of posts 90, provide support structures in which the vertical rollers 89 are journaled.

A strut 93, connected between the upper end of each of the hollow posts 91 and an adjacent leg 28 of an A-frame, reinforces the support structure for roller 87.

A pair of spaced drums 94 and 95 are mounted on a shaft 96 that is journaled through brackets 97 at opposite sides of the trailer, close to the bottoms of the hollow posts. Each drum has one end of a cable 98 fastened thereto and the cable wrapped therearound. Each cable is then passed over a sheave 99, mounted in a housing 100 at the top of the adjacent hollow post 91 and extends inside the hollow post to be fastened at 101 to the bottom of the associated telescoping post 90.

A handle 102 is fixed to the end of shaft 96 adjacent bracket 97 and a conventional dog 103 and sprocket 104 allow handle 102 and shaft 96 to be turned only in the direction to wind the cables 98 onto the drums, unless the dog is pivoted away from the sprocket about its pivot mounting 105.

In practice, the posts 90 will be lowered into hollow posts 91 during highway travel of the vehicle but will be raised to desired height by rotation of handle 102 during cable stringing operations. Thus, it is possible to move the trailer in complete compliance with highway height regulations, and to still elevate cable being paid out sufficiently to maintain the cables discharged from the reels 27 and 79 separated.

Whereas this invention is here described and illustrated with respect to a certain form thereof, it is to be understood that many variations are possible.

We claim:

1. A support for conductor-cable reels, comprising
   a movable platform;
   a pair of spaced support standards carried by said platform;
   a reel support shaft spanning said support standards;
   means journaling said shaft on said standards;
   pneumatically tired wheels carried by said platform and positioned so that the tires engage respective rims of and assist said standards in supporting a reel of conductor cable carried on said shaft; and
   means for braking rotation of said wheels.

2. A support for conductor-cable reels according to claim 1, wherein the means for braking rotation of the wheels comprises remotely controlled hydraulic brakes.

3. A support for conductor-cable reels, according to claim 1, wherein the means journaling the shaft includes half-bearings fixed on top of the respective standards and adapted to cradle opposite ends of the shaft; other half-bearings pivoted on the standard and adapted to overlie the ends, respectively, of the shaft cradled in the fixed half-bearings; and means for clamping each pivoted half-bearing to its associated fixed half-bearing.

4. A support for conductor-cable reels according to claim 1, further including
   a second pair of spaced standards carried by the platform;
   a second reel support shaft spanning said second pair of spaced support standards;
   means journaling said second support shaft on said second support standards;
   additional pneumatically tired wheels carried by the platform and positioned so that the tires engage respective rims and assist said standards in supporting a reel of conductor cable carried on said second reel support shaft; and
   means for braking rotation of said additional wheels.

5. A support for conductor-cable reels according to claim 4, wherein
   the support shaft and second support shaft are aligned in substantially parallel relationship; and wherein
   a raised guide roller is positioned between the support shafts,
   whereby conductor cable from one reel can be passed thereover.

6. A support for conductor-cable reels support according to claim 5, wherein the raised guide roller is supported on extensible towers; and further including means for extending and retracting the towers.

7. A support for conductor-cable reels according to claim 6, including a winch mounted on said platform;
   at least one cable connected at one end to the drum of the winch and at its other end to a lower position of a movable portion of one of said extensible towers, said cable intermediate its length being passed over a pulley at the upper end of a fixed portion of said one extensible tower.

8. A support for conductor-cable reels according to claim 1, wherein the support is mobile.

References Cited

UNITED STATES PATENTS

| | | | |
|---|---|---|---|
| 1,878,859 | 9/1932 | Knabenshue | 254—134.3 |
| 2,316,798 | 4/1943 | Luebbe | 242—54 |
| 2,948,483 | 8/1960 | Petersen | 242—54 |

OTHELL M. SIMPSON, Primary Examiner

U.S. Cl. X.R.

242—156; 254—134.3